United States Patent
Ossipov

(10) Patent No.: US 9,667,595 B2
(45) Date of Patent: May 30, 2017

(54) SELECTIVELY USING NETWORK ADDRESS TRANSLATED MAPPED ADDRESSES BASED ON THEIR PRIOR NETWORK REACHABILITY

(71) Applicant: Andrew E. Ossipov, Richardson, TX (US)

(72) Inventor: Andrew E. Ossipov, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 439 days.

(21) Appl. No.: 13/949,433

(22) Filed: Jul. 24, 2013

(65) Prior Publication Data

US 2015/0032872 A1    Jan. 29, 2015

(51) Int. Cl.
*G06F 15/16* (2006.01)
*H04L 29/12* (2006.01)
*H04L 12/26* (2006.01)

(52) U.S. Cl.
CPC ...... H04L 61/2567 (2013.01); H04L 43/0811 (2013.01); H04L 61/255 (2013.01); H04L 43/08 (2013.01); H04L 43/10 (2013.01); H04L 43/16 (2013.01); H04L 61/2514 (2013.01)

(58) Field of Classification Search
CPC ... H04L 61/2076; H04L 61/25; H04L 65/105; H04L 65/1066; H04L 43/00; H04L 61/2567; H04L 65/1069; H04L 61/2514; H04L 61/2521; H04L 61/255; H04L 61/256; H04L 43/10; H04L 43/08; H04L 43/0811; H04L 43/16

USPC ........ 709/245, 238, 224; 370/352, 400, 389, 370/401; 726/5

See application file for complete search history.

(56) References Cited

U.S. PATENT DOCUMENTS

| | | | |
|---|---|---|---|
| 8,005,098 B2 | 8/2011 | Barach et al. | |
| 8,428,057 B2 | 4/2013 | Valluri et al. | |
| 8,812,730 B2* | 8/2014 | Vos | 370/389 |
| 2004/0073704 A1* | 4/2004 | Paunikar | H04L 29/12367 709/245 |

(Continued)

*Primary Examiner* — Jungwon Chang
(74) *Attorney, Agent, or Firm* — The Law Office of Kirk D. Williams

(57) ABSTRACT

In one embodiment, network address translated (NAT) mapped addresses are selectively used based on their prior network reachability. One embodiment maintains for each particular mapped address (e.g., NAT public address pool member), a reachability status level based on prior usage of the particular mapped address to communicate with external destinations. By continuously monitoring the reachability "health" of mapped addresses, problem-experiencing mapped addresses can be avoided. One embodiment monitors the success and/or failure rates of connection attempts over a rolling time period to provide an up-to-date current view of the reachability status level of corresponding mapped addresses. In one embodiment, a network address translation device assigns, based on their reachability status level, these mapped addresses. One embodiment provides an administrative notification for particular mapped address or ceases using the particular mapped address in response to its reachability status level falling outside a predetermined or calculated level.

20 Claims, 5 Drawing Sheets

(56) References Cited

U.S. PATENT DOCUMENTS

| | | | |
|---|---|---|---|
| 2006/0062203 A1* | 3/2006 | Satapati | H04L 29/06 370/352 |
| 2009/0133105 A1* | 5/2009 | Larsen | H04L 45/26 726/5 |
| 2009/0135842 A1* | 5/2009 | Zhu | H04L 12/66 370/401 |
| 2012/0207173 A1* | 8/2012 | Namihira | H04L 12/6418 370/400 |
| 2012/0284375 A1 | 11/2012 | Remaker | |
| 2013/0301652 A1 | 11/2013 | Oz et al. | |

* cited by examiner

SELECTIVELY USING NETWORK ADDRESS TRANSLATED MAPPED ADDRESSES BASED ON THEIR PRIOR NETWORK REACHABILITY

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Network Address Translation (NAT) is widely used as a method of efficiently utilizing the limited public Internet Protocol version 4 (IPv4) address space as well as providing additional endpoint security (e.g., in a firewall device) by hiding the real IP addresses. Service providers typically use extremely large pools of public IP addresses to service an even larger number of internal Internet-connected clients (user workstations, laptops, smartphones, tablets, and so on). Such NAT pools may be comprised of wide supernets, smaller subnets, and contiguous or discontiguous individual IP address ranges.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
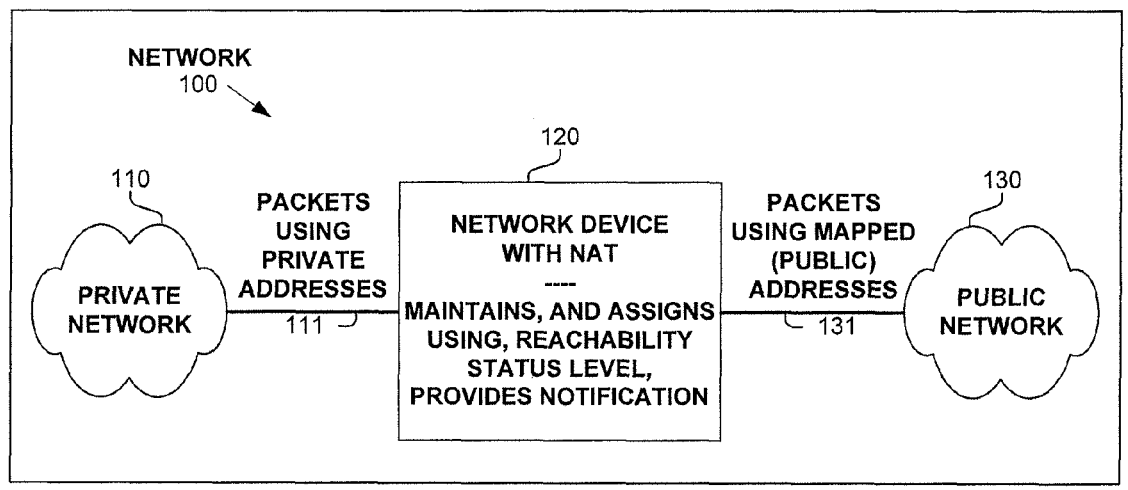
FIG. 1 illustrates a network operating according to one embodiment.

Disclosed are, inter alia, methods, apparatus, computer-storage media, mechanisms, and means associated with selectively using network address translated mapped addresses based on their prior network reachability. One embodiment maintains for each particular mapped address of a plurality of mapped addresses a reachability status level based on prior usage of said particular mapped address to communicate with external destinations. In one embodiment, a network address translation device assigns, based on the reachability status level of addresses of the plurality of mapped addresses, mapped addresses of the plurality of mapped addresses for use with private addresses. One embodiment provides an administrative notification for said particular mapped address in response to its reachability status level falling outside a predetermined or calculated level.

2. Description

Disclosed are, inter alia, methods, apparatus, computer-storage media, mechanisms, and means associated with selectively using network address translated mapped addresses based on their prior network reachability. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

As used herein, reachability status refers to a measure of recent ability to reach an intended destination(s) over a period of time. Reachability status of a particular address-translated mapped address does not refer to whether or not the particular address-translated mapped address is currently in use. A network address translation device provides mappings between "mapped addresses" in the external network and "private addresses" in the internal network. Administrative notification refers to logging a condition, generating an alarm or warning, or other notification such as to an operator or network management system.

One embodiment selectively assigns network address translated mapped addresses based on their prior network reachability, such as to increase the likelihood that the mapped address can be used successfully. Errors in upstream forward and reverse routing policies, misconfigured access control lists, or external blacklisting may prevent reachability from certain NAT IP pool member addresses ("mapped" addresses) to the Internet. As the result, internal clients whose private IP address happens to be mapped to such an IP address by the edge device may experience limited or no connectivity. Due to the large number of internal clients that open many external Transmission Control Protocol (TCP) and User Datagram Protocol (UDP) connections, such problems may go unnoticed for an extended period of time. This problem is especially acute when the network address translation includes Port Address Translation (PAT), because connections from a same client may land on different NAT IP pool members. Overall, this situation is generally very hard to troubleshoot and presents a significant supportability challenge to customers and providers.

In overcoming some of these issues, one embodiment selectively assigns network address translated mapped addresses based on their prior network reachability. By continuously monitoring the reachability "health" of NAT pool IP members, the prior-problem-experiencing mapped addresses can be avoided and/or administrative notification provided to signal an operator to take action. One embodiment monitors the success and/or failure rates of connection attempts over a rolling time period to provide an up-to-date current view of the reachability status level of corresponding mapped addresses. When stateful network address translation is performed, the network address translation device maintains connection status, so the connection attempt information is readily available for one embodiment. When stateful network address translation is not used, one embodiment approximates connection attempts success and failures based on overall packets sent and received and their ratio. In at least some of these and other embodiments, the connection success/failure data (whether actual or approximated) is used to generate a metric (e.g., a success or failure percentage or ratio) which can be used to sort mapped addresses (such that those with a higher current success rate will be used first); or to compare against a dynamic (e.g., overall average) or static threshold value(s) to trigger corrective action (e.g., removing mapped address from a NAT pool for at least a period of time, providing administrative notification.

Turning to the figures, FIG. 1 illustrates a network 100 operating according to one embodiment including a private network 110 (e.g., using "private" addresses 111) and a public network 130 (using "public" addresses including "mapped" addresses 131). Network device 120 performs the network address translation between private and mapped addresses. In one embodiment, network device 120 maintains reachability status level information (e.g., a reachability status level metric or data used to derive the metric). In one embodiment another network device maintains the reachability status level information.

In one embodiment, network device 120 uses this reachability status level information to smartly assign mapped addresses such as to decrease the use of mapped addresses which, at least recently, have experienced connectivity or other problems (e.g., misrouting performed or blocked within network 130). In one embodiment, network device 120 uses this reachability status level information to provide administrative notification to provide alerts regarding mapped addresses which, at least recently, have experienced connectivity or other problems (e.g., misrouting performed or blocked within network 130).

Figure 2A:
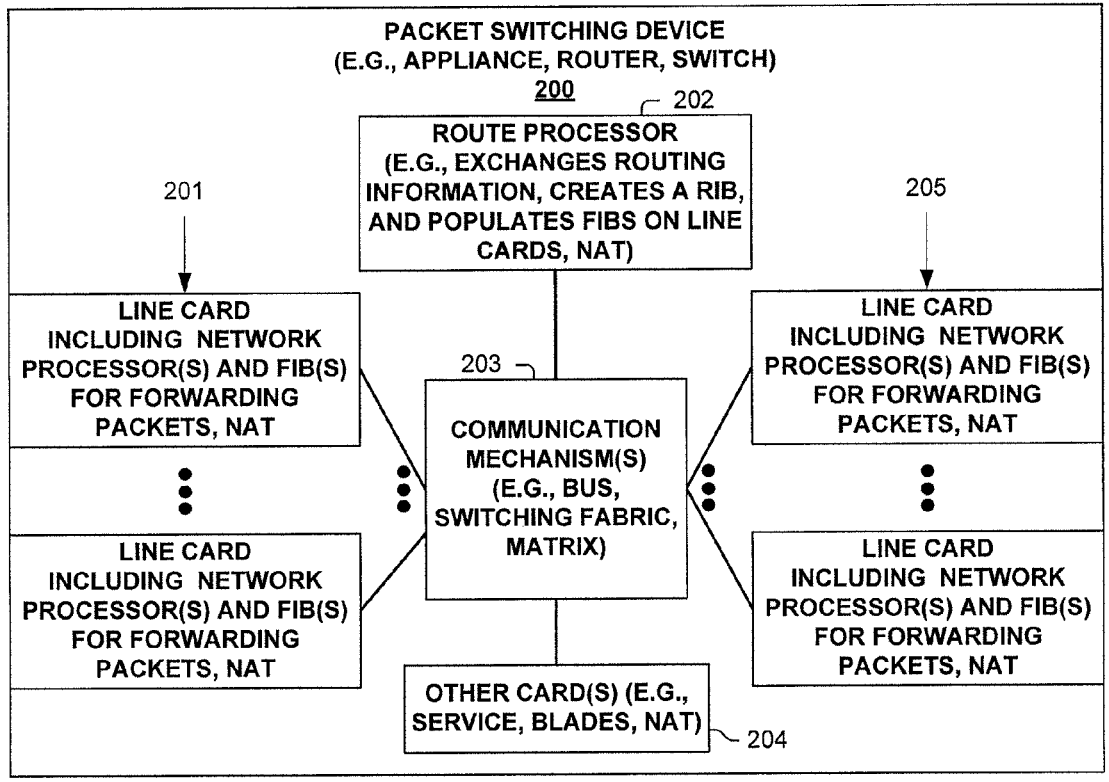
FIG. 2A illustrates a packet switching device according to one embodiment.

One embodiment of a packet switching device 200 (e.g., one example of a network node) is illustrated in FIG. 2A. As shown, packet switching device 200 includes multiple line cards 201 and 205, each with one or more network interfaces for sending and receiving packets over communications links, and with one or more processing elements that are used in one embodiment associated with selectively using network address translated mapped addresses based on their prior network reachability. Packet switching device 200 also has a control plane with one or more processing elements 202 for managing the control plane and/or control plane processing of packets associated with selectively using network address translated mapped addresses based on their prior network reachability. Packet switching device 200 also includes other cards 204 (e.g., service cards, blades) which include processing elements that are used in one embodiment to process packets associated with selectively using network address translated mapped addresses based on their prior network reachability, and some communication mechanism 203 (e.g., bus, switching fabric, matrix) for allowing its different entities 201, 202, 204 and 205 to communicate.

Figure 2B:
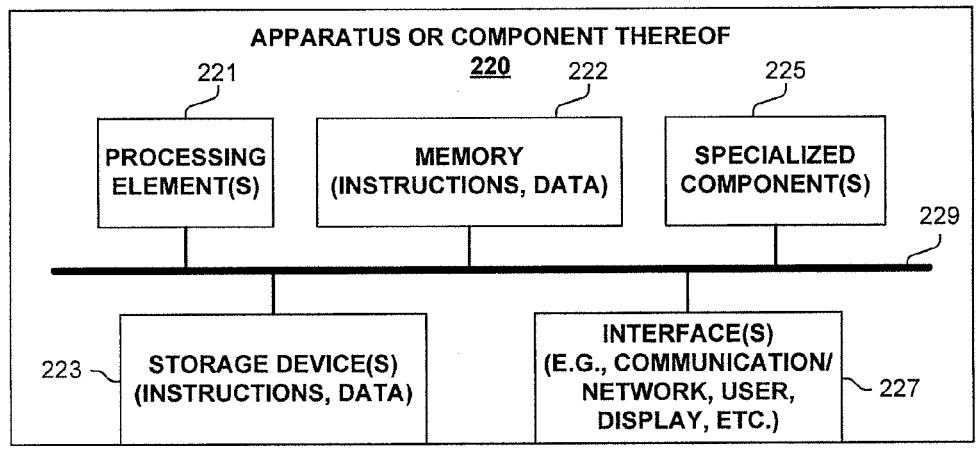
FIG. 2B illustrates an apparatus according to one embodiment.

FIG. 2B is a block diagram of an apparatus 220 used in one embodiment associated with selectively using network address translated mapped addresses based on their prior network reachability. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
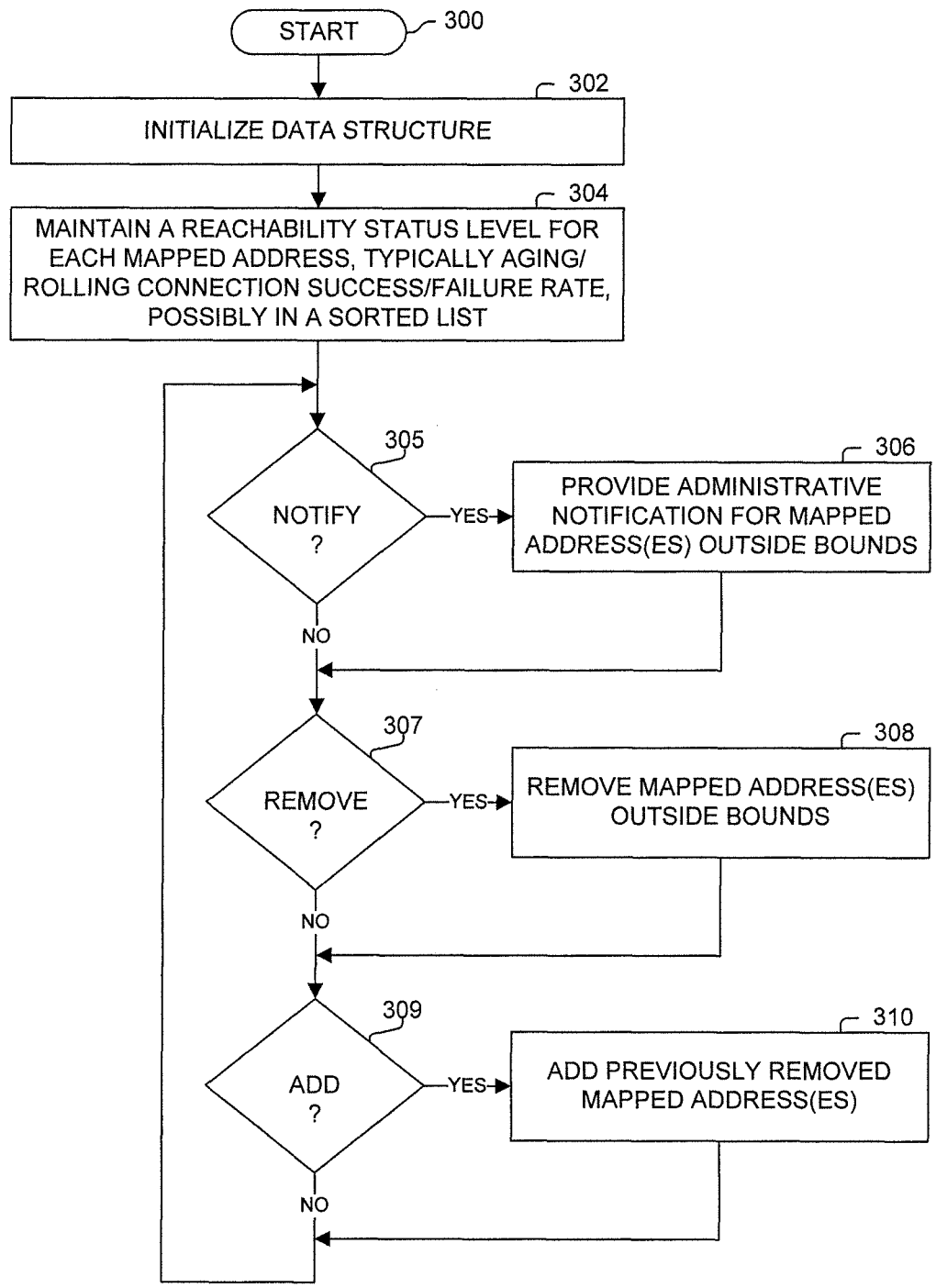
FIG. 3 illustrates a process according to one embodiment.

FIG. 3 illustrates a process performed in one embodiment. Processing begins with process block 300. In process block 302, a data structure used in maintaining the reachability status level for mapped addresses is initialized.

Figure 4:
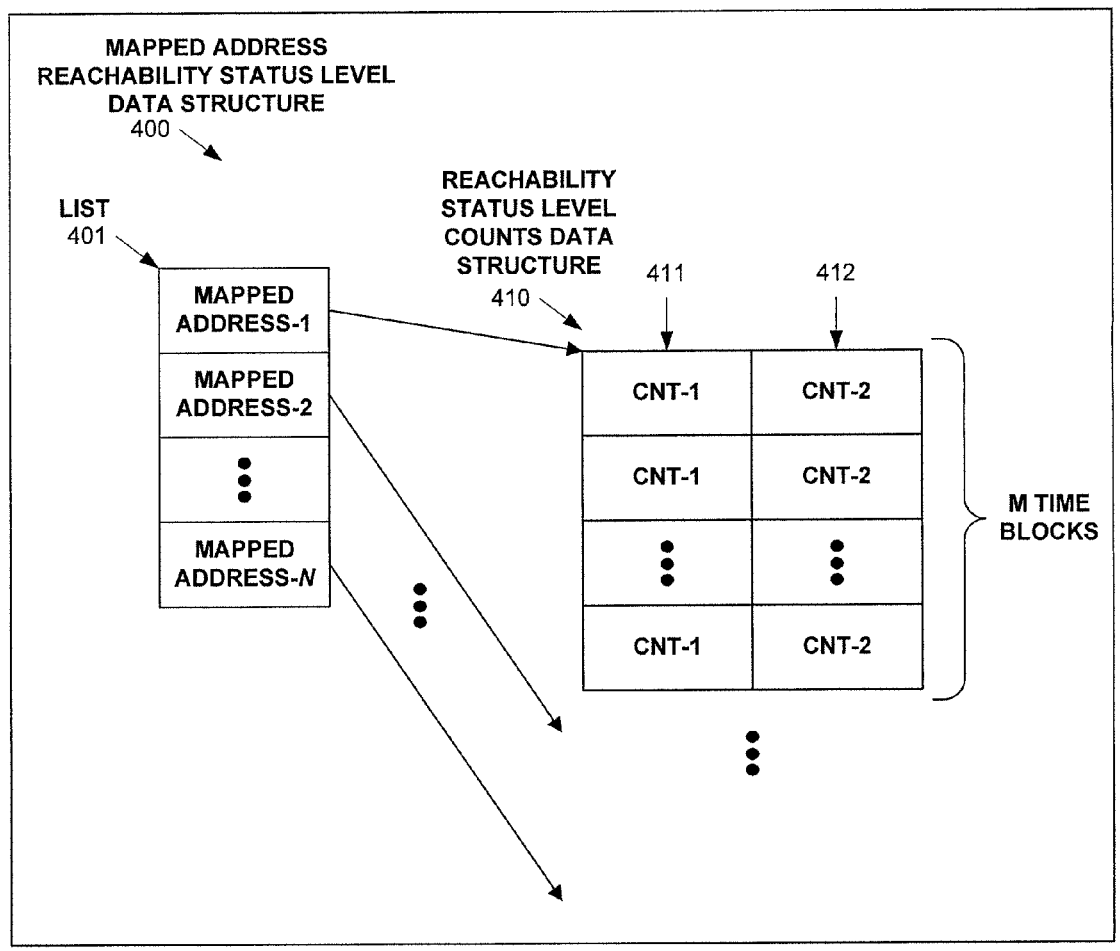
FIG. 4 illustrates a data structure according to one embodiment.

FIG. 4. illustrates a mapped address reachability status level data structure 400 used in one embodiment. As shown, a list 401 of mapped addresses is maintained, with pointers from each mapped address to corresponding reachability status level counts data structure 410. In one embodiment, data structure 410 is a two-dimensional array with two counts maintained for each of M time blocks (e.g., time frames of some predetermined length such as, but not limited to, ten seconds). In one embodiment, counts 411 and 412 are counts corresponding to two of connection attempt success, connection attempt failure, or total connection attempts (if you have two of these, you can derive the third). By maintaining 411 and 412 in individual time frames, they can be rolled over and used to provide a most recent snapshot of the reachability status level.

Returning to FIG. 3, processing continues with process block 304, wherein a reachability status level for each mapped address is maintained. One embodiment uses aging of connection attempt success and failure counts to calculate a metric of connection success or failure rate. One embodiment, maintains mapped addresses in a sorted list such that mapped addresses with a higher connection attempt success rate (or lower connection attempt failure rate) will be used first for network address translation. The processing of process block 304 continues to maintain this information, and processing also proceeds to process block 305.

As determined in process block 305, if an administrative notification should be provided (e.g., the reachability status level of one or more mapped addresses falls outside a predetermined or calculated, such as an overall average, level), then in process block 306, corresponding administrative notification(s) are provided.

As determined in process block 307, if one or more mapped addresses should be removed from the NAT pool (e.g., no longer used) as their reachability status level falls outside a predetermined or calculated (e.g., an overall average, level), then in process block 308, these mapped address(es) are removed from the NAT pool.

As determined in process block 309, if one or more mapped addresses should be added back into the NAT pool (e.g., start to use again) as sufficient time has elapsed since being removed from the NAT pool and/or additional addresses are needed to meet customer demand), then in process block 310, these mapped address(es) are added into the NAT pool.

Processing returns to process block 305 (while the reachability status level of mapped addresses continues to be maintained in process block 304).

Figure 5:
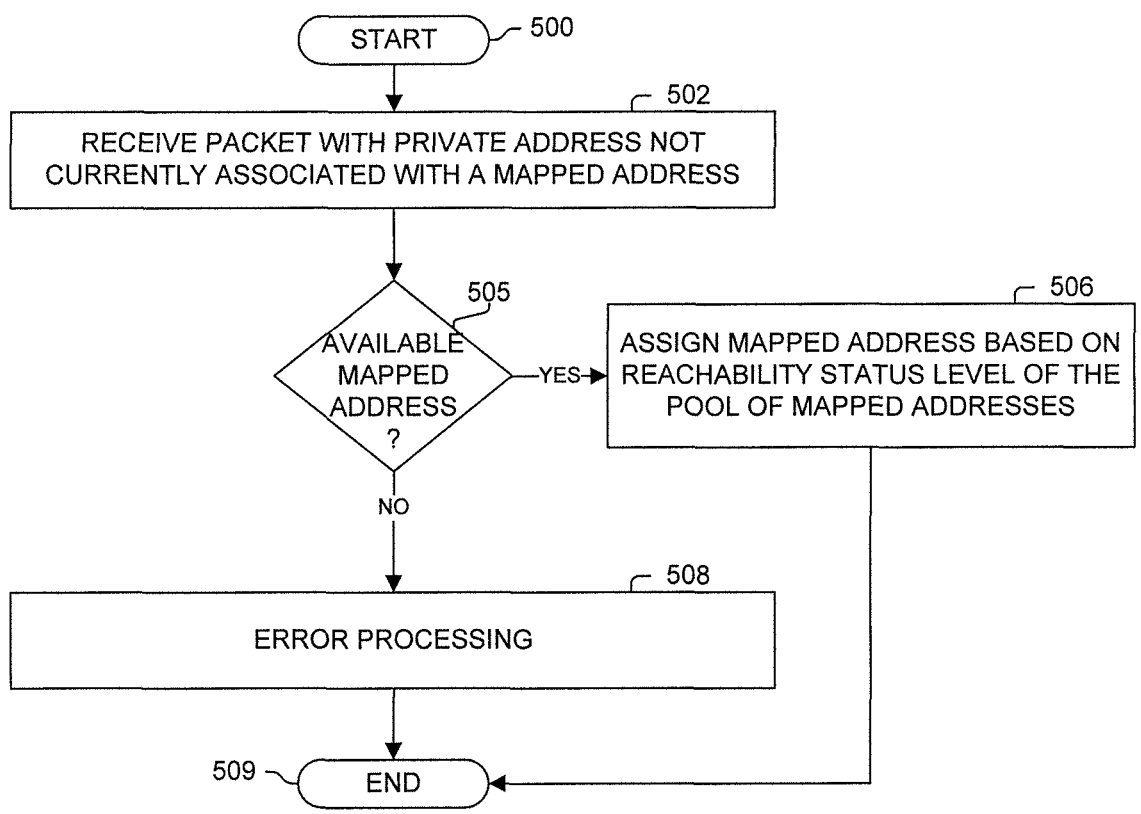
FIG. 5 illustrates a process according to one embodiment.

FIG. 5 illustrates a process performed in one embodiment by a network device performing network address translation. Processing begins with process block 500. In process block 502, a packet is received with a private network address (e.g., on the private network side of the network address translation device), that needs to be assigned a mapped address.

As determined in process block 505, if a mapped address is available in the NAT pool, then in process block 506, a mapped address is assigned based on the reachability status level of mapped addresses in the NAT pool. In one embodiment, a mapped address with a higher/highest positive (successfully previously used) reachability status level is assigned. In one embodiment, a mapped address with a positive (successfully previously used) reachability status level above a predetermined or calculated (e.g., average) is assigned. Processing of the flow diagram of FIG. 5 is complete as indicated by process block 509.

Otherwise, it was determined in process block 505 that no mapped addresses remain available, and then error processing is performed in process block 508. Processing of the flow diagram of FIG. 5 is complete as indicated by process block 509.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

maintaining for each specific public address of a plurality of public addresses a reachability status level based on prior usage of said specific public address being used as a mapped private address of one or more internal clients to communicate with one or more external destinations through a network address translation device providing mappings between public addresses of the plurality of public address and private addresses of said internal clients, with said internal clients being located on the private side of the network address translation device and said external destinations being on the public side of the network address translation device; and in response to the network address translation device receiving a particular packet including a particular private address of a particular internal client with the particular private address not currently associated with one of the plurality of public addresses, selectively assigning a particular public address of the plurality of public addresses to be mapped with the particular private address of the particular internal client by the network address translation device based on the reachability status level of addresses of the plurality of public addresses and using the particular private address and the particular public address in communicating packets between the particular internal client and one or more of particular external destinations through the network address translation device;

wherein the reachability status level refers to a current measure of an ability to reach an intended one or more destinations over a period of time.

2. The method of claim 1, wherein said prior usage includes a metric based on a plurality of connection attempts to external destinations using said specific public address.

3. The method of claim 2, wherein the network address translation device maintains states of connections of translated addresses; and wherein the method includes deriving said metric based on a plurality of connection attempts using information from said maintained states of connections of translated addresses.

4. The method of claim 2, wherein said maintaining the reachability status level includes determining a rolling connection success rate or rolling connection failure rate.

5. The method of claim 4, wherein said selectively assigning the particular public address to be mapped with the particular private address based on the reachability status level of addresses of the plurality of public addresses includes avoiding one or more public addresses whose said rolling connection success rate or said rolling connection failure rate is outside a predetermined or calculated threshold.

6. The method of claim 5, wherein the threshold is based on a current average of connection success or failure rates of the plurality of public addresses.

7. The method of claim 5, wherein the threshold is a predetermined value.

8. The method of claim 5, wherein said avoiding public addresses whose said rolling connection success rate or said rolling connection failure rate is outside the predetermined or said calculated threshold includes removing from the plurality of public addresses public addresses whose said rolling connection success rate or said rolling connection failure rate is outside the predetermined or said calculated threshold.

9. The method of claim 1, wherein said prior usage includes counting packets sent using said specific public address and counting packets received using said specific public address.

10. The method of claim 9, wherein said prior usage includes a metric based on a ratio between said counted sent and received packets.

11. The method of claim 1, further comprising providing an administrative notification for said specific public address in response to a reachability status level of said specific public address falling outside a predetermined or calculated level.

12. The method of claim 1, comprising sorting public addresses of the plurality of public addresses based on their said reachability status level; and wherein said selectively assigning the particular public address to be mapped with the particular private address includes selecting the particular public address based on the position of the particular public address in said sorted plurality of public addresses.

13. The method of claim 1, wherein for one or more of the plurality of public addresses said prior usage of said specific public address to communicate with external destinations is determined with said specific public address being associated with a plurality of different private addresses at different times.

14. A network device including network address translation functionality, comprising:
   memory;
   a plurality of interfaces sending and receiving packets; and
   one or more processing elements performing operations, including:
   maintaining for each specific public address of a plurality of public addresses a reachability status level based on prior usage of said specific public address being used as a mapped private address of one or more internal clients to communicate with one or more external destinations through the network device with said internal clients being located on the private side of the network device and said external destinations being on the public side of the network device; and
   in response to the network device receiving a particular packet including a particular private address of a particular internal client with the particular private address not currently associated with one of the plurality of public addresses, selectively assigning a particular public address of the plurality of public addresses to be mapped with the particular private address of the particular internal client by the network device based on the reachability status level of addresses of the plurality of public addresses and using the particular private address and the particular public address in communicating packets between the particular internal client and one or more of particular external destinations through the network device;
   wherein the reachability status level refers to a current measure of an ability to reach an intended one or more destinations over a period of time.

15. The network device of claim 14, wherein said operations include providing an administrative notification for said specific public address in response to a reachability status level of said specific public address falling outside a predetermined or calculated level.

16. The network device of claim 15, wherein said prior usage includes a metric based on a plurality of connection attempts to external destinations using said specific public address.

17. The network device of claim 14, wherein said prior usage includes a metric based on a plurality of connection attempts to external destinations using said specific public address.

18. The network device of claim 17, wherein the network device maintains states of connections of translated addresses; and wherein the method includes deriving said metric based on a plurality of connection attempts using information from said maintained states of connections of translated addresses.

19. The network device of claim 17, wherein said maintaining the reachability status level includes determining a rolling connection success rate or rolling connection failure rate; and wherein said selectively assigning the particular public address to be mapped with the particular private address based on the reachability status level of addresses of the plurality of public addresses includes avoiding one or more public addresses whose said rolling connection success rate or said rolling connection failure rate is outside a predetermined or calculated threshold.

20. A method, comprising:
   maintaining for each particular mapped address of a plurality of mapped addresses a reachability status level based on prior usage of said particular mapped address to communicate with external destinations; and assigning, by a network address translation device based on the reachability status level of addresses of the plurality of mapped addresses, mapped addresses of the plurality of mapped addresses for use with private addresses;

wherein said prior usage includes a metric based on a plurality of connection attempts to external destinations using said particular mapped address;

wherein said maintaining the reachability status level includes determining a rolling connection success rate or rolling connection failure rate;

wherein said assigning mapped addresses based on the reachability status level of addresses of the plurality of mapped addresses includes avoiding mapped addresses whose said rolling connection success rate or said rolling connection failure rate is outside a predetermined or calculated threshold; and wherein said avoiding mapped addresses whose said rolling connection success rate or said rolling connection failure rate is outside the predetermined or said calculated threshold includes removing from the plurality of mapped addresses mapped addresses whose said rolling connection success rate or said rolling connection failure rate is outside the predetermined or said calculated threshold.

* * * * *